US006204960B1

(12) United States Patent
Desurvire

(10) Patent No.: US 6,204,960 B1
(45) Date of Patent: Mar. 20, 2001

(54) QUASI-DISTRIBUTED AMPLIFICATION IN A FIBER OPTIC SOLITON SIGNAL TRANSMISSION SYSTEM

(75) Inventor: Emmanuel Desurvire, Bruyeres le Chatel (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/348,003

(22) Filed: Jul. 6, 1999

(30) Foreign Application Priority Data

Jul. 6, 1998 (FR) .................................... 98 08625

(51) Int. Cl.$^7$ ............................... H01S 3/30; H04K 3/00; H04J 14/02; H04B 10/02

(52) U.S. Cl. .......................... 359/341; 359/337; 359/345; 359/115; 359/174

(58) Field of Search .................................... 359/124, 194, 359/174, 334, 341, 345

(56) References Cited

U.S. PATENT DOCUMENTS

| 4,700,339 | * 10/1987 | Gordon ..................................... 370/3 |
| 5,035,481 | * 7/1991 | Mollenauer .............................. 350/96 |
| 5,039,199 | 8/1991 | Mollenauer et al. . |
| 5,058,974 | * 10/1991 | Mollenauer .............................. 359/341 |
| 5,557,441 | * 9/1996 | Mollenauer ............................. 359/173 |

FOREIGN PATENT DOCUMENTS

| 8-248 455 | 9/1996 | (JP) . |
| WO 98/36512 | * 2/1998 | (WO) ............................. H04B/10/00 |

OTHER PUBLICATIONS

Nakazawa, et al., 20/Gbit/s Solition Transmission Over 200km using Erbium–doped Fibre Repeaters, Sep. 13, 1990, Electronics Letters, vol. 26, No. 19, pp. 1592–1593.*

Mollenauer, L., Soliton Propagation in Long Fibers with Periodically Compesated Loss, Jan. 1, 1986, IEEE Journal of Quantum Electronics, vol. QE–22 No. 1, pp. 157–173.*

Giles, C.R. and Desurvire, Emmanuel, Propagation of Signal and Noise in concatenated Erbium–Doped Fiber Optical Amplifiers, Feb. 2, 1991, Journal of Lightwave Tehcnology, vol. 9, No. 2, pp. 147–154.*

Mollenauer, L., Wavelength Division Multiplexing with Solitons in Ultra–long Distance Transmission Using Lumped Amplifiers, Mar. 3, 1991, Journal of Lightwave Technology, vol. 9 No. 3, pp. 362–367.*

Aubin, G. et al.: "Record 20–Gigabit–per–second 200 –km Repeater Span Transoceanic Soliton Transmission Using In–Line Remote Pumping" IEEE Photonics Technology Letters, vol. 8, No. 9, Sep. 1996, pp. 1267–1269, XP000624896.

Lester, C. et al.: "Soliton Transmission Over More Than 90 KM Using Distributed Erbium–Doped Fibres" Electronics Letters, vol. 31, No. 3, Feb. 2, 1995, pp. 219–220, XP000504223.

(List continued on next page.)

Primary Examiner—Thomas H. Tarcza
Assistant Examiner—Deandra M. Hughes
(74) Attorney, Agent, or Firm—Sughue, Mion, Zinn, Macpeak & Seas, PLLC

(57) ABSTRACT

The invention concerns a wavelength-division multiplex soliton signal fiber optic transmission system; to reduce the effects of collision jitter on the soliton channels, it proposes quasi-distributed amplification combining lumped amplification and distributed amplification. In this way it is possible to combine pumping of a lightly doped line fiber an dumped amplification by an EDFA in the repeaters. Reduncant and common pumping means are advantageously used for the lumped amplification and the distributed amplification and the gain of the lumped amplification is advantageously controlled automatically.

23 Claims, 4 Drawing Sheets

OTHER PUBLICATIONS

Iwatsuki, K. et al.: "20 Gb/s Optical Soliton Date Transmission Over 70 KM Using Distributed Fiber Amplifiers" IEEE Photonics Technology Letters, vol. 2, No. 12, Dec. 1, 1990, pp. 905–907, XP000172352.

Wang, H. et al.: "Optimal Design of a Long Distance WDM Soliton Communication System with Lumped Amplifiers" journal of Optical Communications, vol. 19, No. 2, Apr. 1998, pp. 50–53, XP000751320.

* cited by examiner

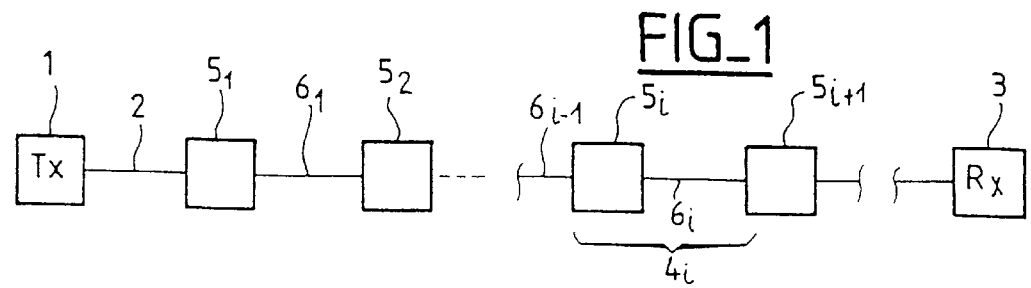
FIG_1
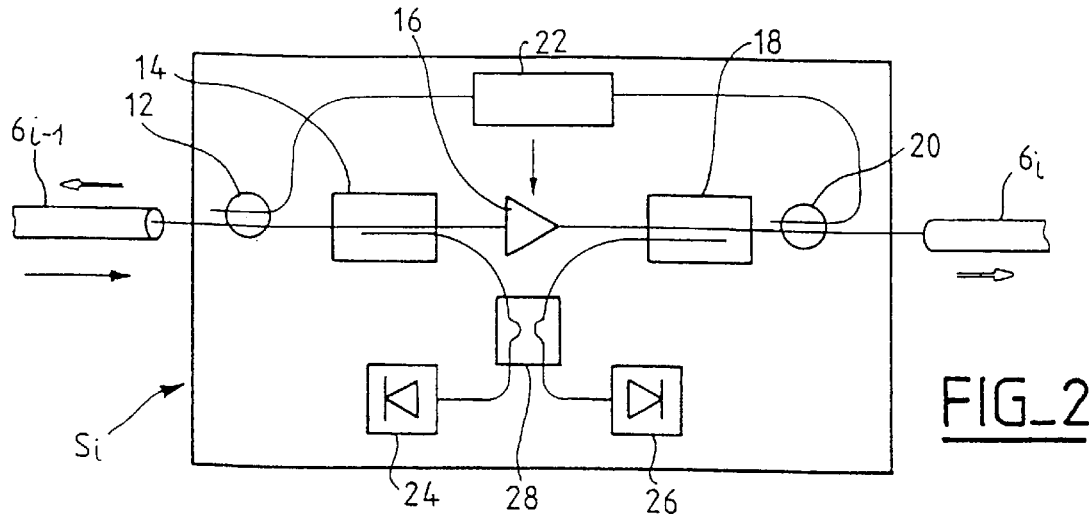
FIG_2
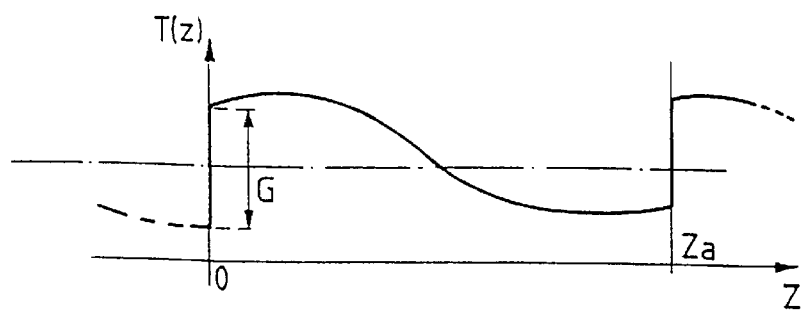
FIG_3
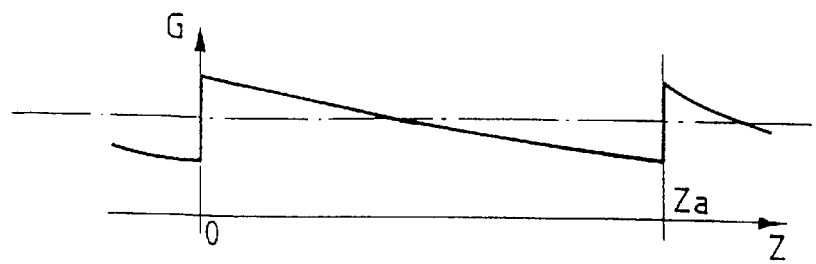
FIG_4
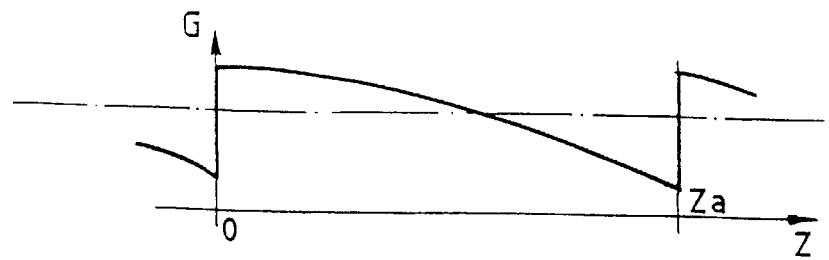
FIG_5

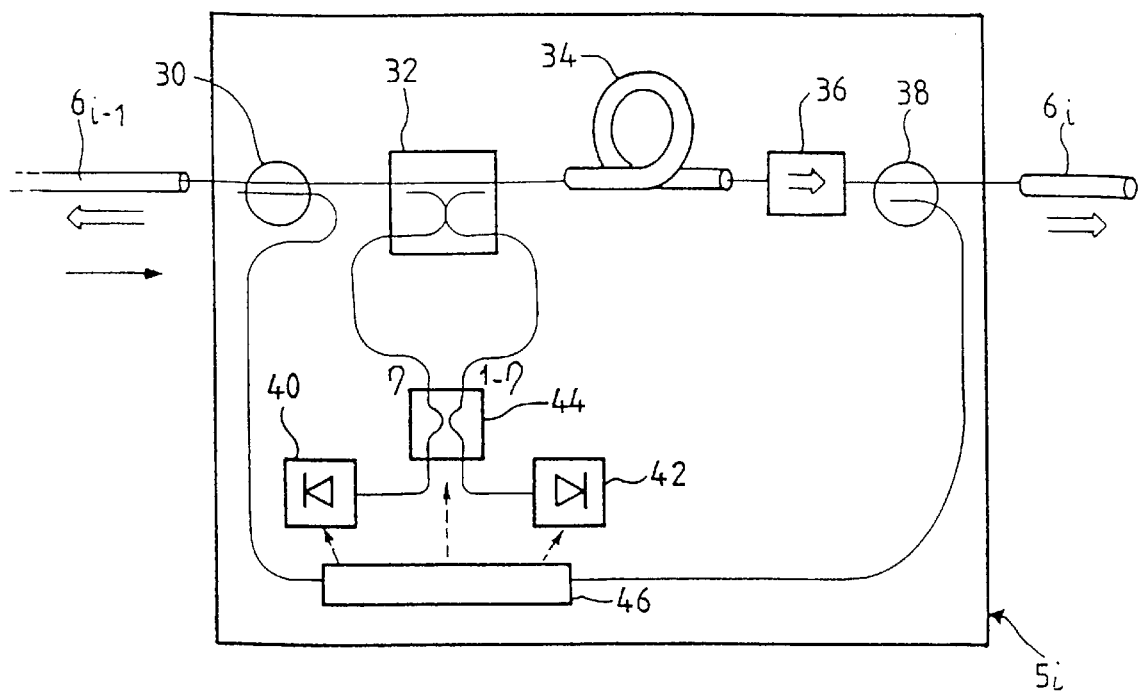
FIG_6
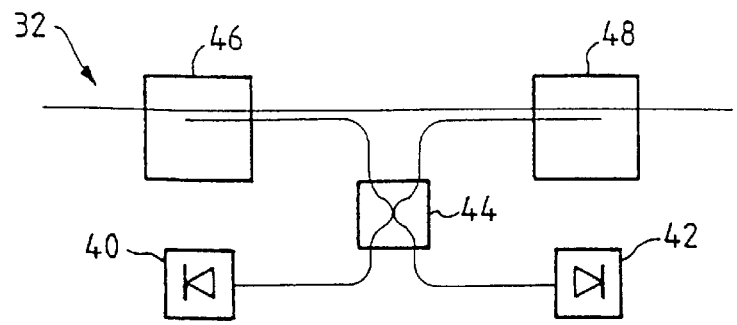
FIG_7
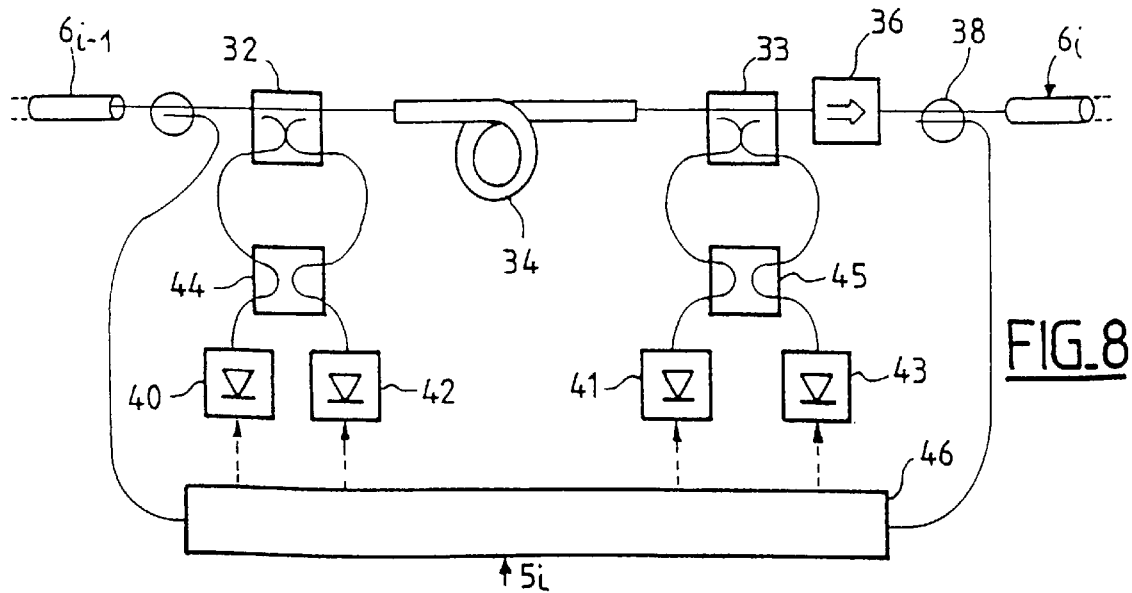
FIG_8

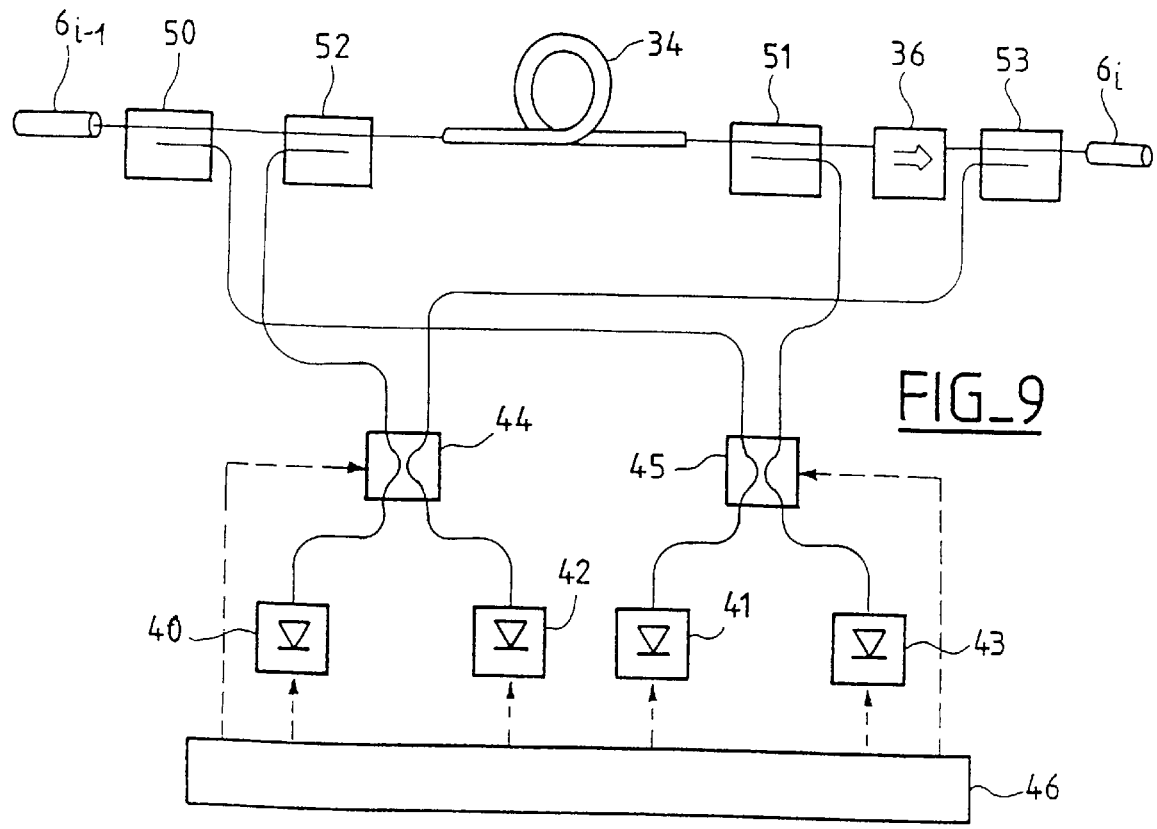
FIG_9
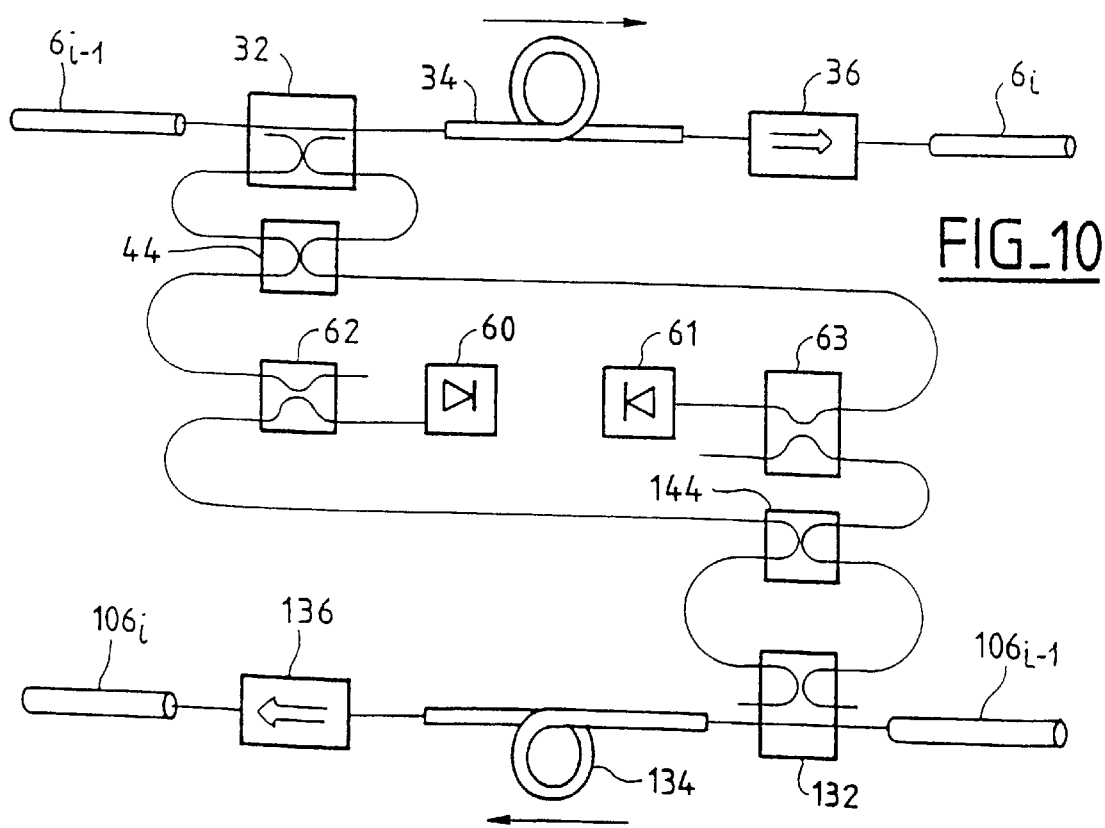
FIG_10

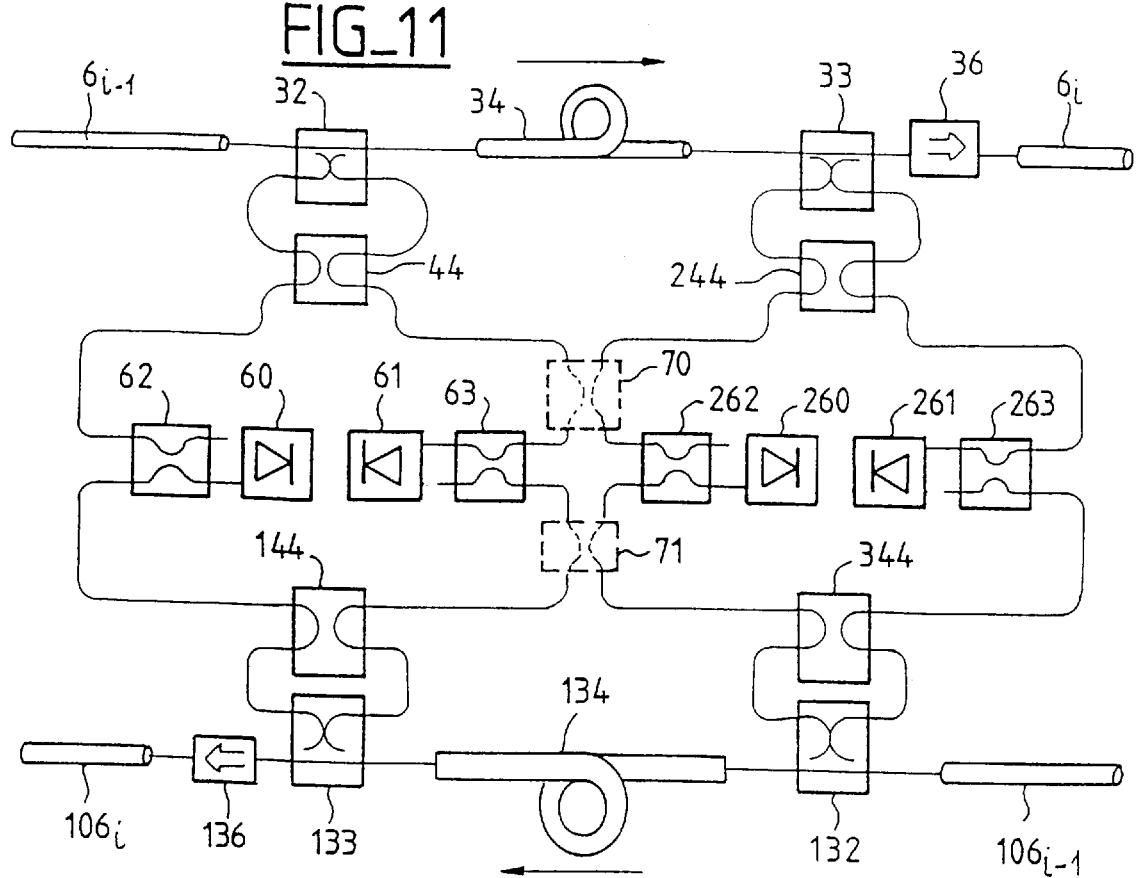
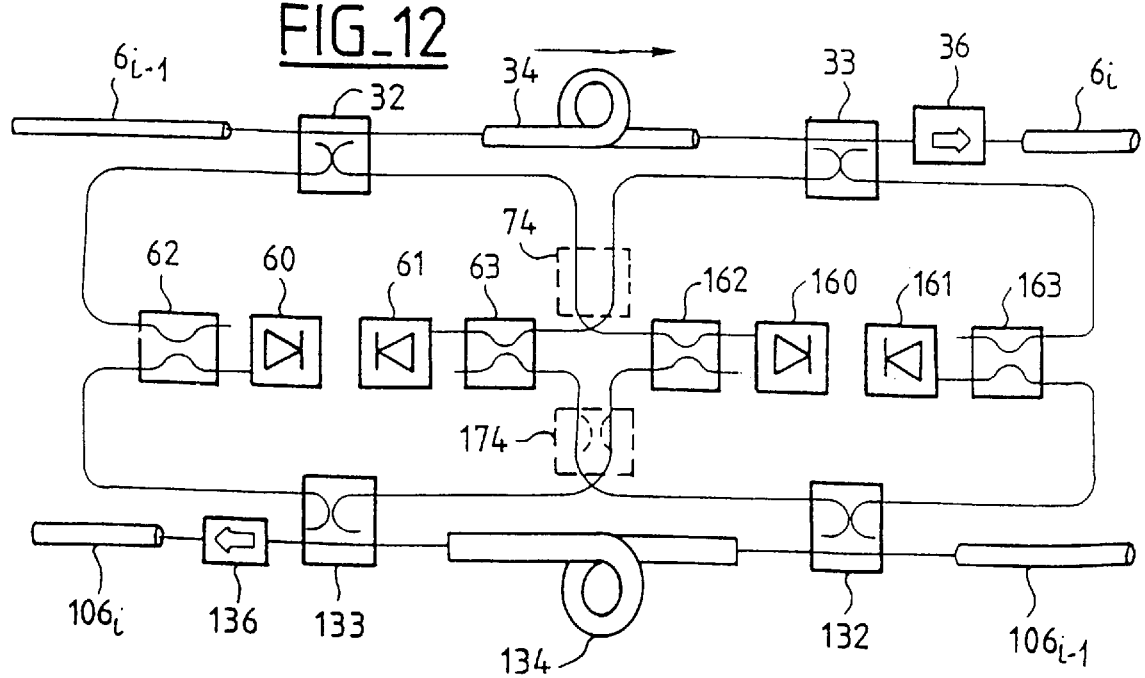

QUASI-DISTRIBUTED AMPLIFICATION IN A FIBER OPTIC SOLITON SIGNAL TRANSMISSION SYSTEM

The present invention consists in a wavelength-division multiplex fiber optic soliton signal transmission system and a method of transmission in a system of this kind which reduces the effects of time-jitter.

BACKGROUND OF THE INVENTION

Transmitting soliton pulses or solitons in the part of an optical fiber with abnormal dispersion is known in itself. Solitons are pulse signals with a $sech^2$ pulse shape. With pulses of this shape, the non-linearity in the corresponding part of the fiber compensates the dispersion of the optical signal. Modeling transmission of solitons using the non-linear Schrödinger equation is known in itself.

Various effects limit the transmission of such pulses, such as the jitter induced by interaction of the solitons with noise present in the transmission system, as described for example in the article by J. P. Gordon and H. A. Haus, Optical Letters, Vol. 11, No. 10, pages 665–667. This effect, known as the Gordon-Haus effect or Gordon-Haus jitter, imposes a theoretical limit on the quality or bit rate of soliton transmission. Synchronous modulation of the soliton signals using semiconductor modulators is one way of exceeding this limit. Systems of sliding guide filters for controlling the jitter of the transmitted solitons have also been proposed, for example in EP-A-0 576 208. Using the Kerr effect in synchronous amplitude or phase modulators and using saturable absorbers to regenerate the signal on the line have also been proposed.

Using wavelength-division multiplexing (WDM) to increase the bit rate of soliton signal fiber optic transmission systems has also been proposed.

In this case, asymmetric collisions between the solitons of the various channels cause unwanted time-jitter. This jitter is inherent to the use of lumped amplifiers: the solitons of the various channels of the multiplex do not interact in the same way at low power (before amplification) and at high power (after amplification). This time-jitter exists both in passive systems, such as guide filters, and in active systems, for example systems using synchronous regeneration.

This problem is discussed in A. F. Evan and J. V. Wright, "Constraints on the design of single channel high capacity (>10 Gbit/s) soliton systems", IEEE Photon Technology Letters, Vol. 7, No. 1, p. 117 (119); this article explains that the problem of Gordon-Haus jitter is the limiting factor for 10 Gbit/s transoceanic systems using solitons; however, for transmission at higher bit rates, the transmission distance or the distance between amplifiers is limited by interference caused by lumped amplification. That article suggests using fiber with decreasing dispersion or distributed optical amplification, which could locally compensate the dispersion and non-linearities of the fiber.

A first type of solution that has been proposed consists in correcting the losses in the fiber by appropriately controlling the dispersion. D. J. Richardson et al., "Periodically amplified system based on loss compensating dispersion decreasing fiber", Electronics Letters, Vol. 32, No. 4, p. 373 (1996) proposes an experimental configuration of a recirculating loop using line fibers whose dispersion profile follows the loss profile. Using line fiber whose dispersion profile decreases exponentially between amplifiers enables transmission distances in the order of 266 km to be achieved in this system; the system is nevertheless limited by time-jitter.

An article by L. F. Mollenauer et al., "Wavelength Division Multiplexing with Solitons in Ultra Long Distance Transmissions using Lumped Amplifiers", Journal of Lightwave Technology, Vol. 9, No. 3, pages 362–367 (1991) describes the problem of collisions between solitons in wavelength-division multiplex transmission systems and emphasizes the variations in propagation speed induced by collisions; that article explains that variations in the chromatic dispersion of the fiber along the transmission path can compensate the effects of collisions; it therefore proposes using segments with different dispersion to compensate the effects of collisions on the soliton propagation speed.

An article by A. Hasegawa, S. Kumar and Y. Kodoma, "Reduction of Collision-Induced time-jitter in Dispersion-managed Solitons Transmission Systems", Optics Letters, Vol. 21, No. 1, January 1996, pages 39–41, proposes a fiber dispersion management scheme which increases the distance between amplifiers. That solution is based on a stepped dispersion profile in the fiber approximating an ideal exponential profile as closely as possible.

The above solutions remain difficult to implement on an industrial scale: it is necessary to produce large quantities of fiber having a specific dispersion profile, to concatenate 20 km segments and to splice the fiber to other components. From the production point of view, the solution consisting in approximating the exponential dispersion profile by steps of constant dispersion is subject to the same control and segment assembly constrains; moreover, the acceptable tolerances for the dispersion and the segment length decrease rapidly as the number of steps decreases.

Another type of solution consists in using distributed amplification along the fiber.

L. F. Mollenauer et al., "Soliton propagation in long fibers with periodically compensated loss", IEEE Journal of Quantum Electronics, Vol. QE-22, No. 1, p. 157 (1986) describes digital simulation of a transmission system in which losses are periodically compensated by the Raman gain. For this purpose, the article proposes periodically (every 50 km) injecting a pump into the line fiber, the difference between the wavelength of the solitons and the wavelength of the pump being chosen to correspond to the peak Raman gain in the fiber. The article also considers the effect of the collision between two solitons of a wavelength-division multiplex to show the theoretical possibility of wavelength-division multiplex transmission, despite the effects of collisions on the solitons.

A. Hagesawa, "Amplification and reshaping of optical solitons in a glass fiber—IV: use of the stimulated Raman process", Optics Letters, vol. 8, No. 12, p. 650 (1983) does not describe the problem of the asymmetry of collisions between solitons of adjoining channels; that article proposes a single-channel transmission system using distributed amplification by the stimulated Raman effect; in the example given, powers in the order of 70 mW are injected every 43 km.

J. R. Simpson et al., "A distributed Erbium doped fiber amplifier", Proc. Conference on Optical Communications, OFC'90, paper PD19 (1990) does not describe the problem either, but proposes a method of fabricating a fiber for an erbium-doped fiber distributed amplifier; the erbium concentrations obtained are sufficiently low to enable distributed amplification along the line fiber.

Similarly, S. T. Davey et al., "Lossless transmission over 10 km of erbium-doped fiber using only 15 mW pump power", Electronics Letters, Vol. 26, No. 2, p. 1148 (1990) proposes another method of fabricating a fiber for an erbium-doped fiber distributed amplifier. That article mentions application to soliton systems, but not the problem of the asymmetry of collisions.

That type of distributed amplification poses problems; high pump powers are needed to obtain the stimulated Raman effect; these powers are typically in the order of 300 mW at wavelengths of 1.45 mm for 30 km segments with pumping in both directions. Although such powers are technically feasible, the necessary power and reliability in practice rule out this solution. Erbium-doped fiber distributed amplification systems have a high noise level compared to lumped amplifiers: noise levels are typically 7 to 9 dB for a 50 km segment, compared to values in the order of 4.5 dB for a segment of the same length using lumped amplification; the pump power needed to assure the transparency of the link is also fairly high, typically 100 mW, or to be more precise 50 mW in each direction, at 1.48 mm.

Finally, it has also been proposed to use very closely spaced amplifiers. The aforementioned article by L. F. Mollenauer et al. in the Journal of Lightwave Technology also shows that solitons at different wavelengths are transparent to each other in a lumped amplification transmission system if the length of the collision, i.e. the distance that the solitons travel along he fiber while they are traversing each other, is large relative to the spacing of the amplifiers. The article proposes using lumped amplifiers with a spacing of 20 km. This solution is difficult to implement for economic reasons.

On the subject of wavelength-division multiplex transmission, an article by E. Desurvire, O. Leclerc, and O. Audouin, Optics Letters, Vol. 21, No. 14, pages 1026–1028 describes a wavelength allocation scheme which is compatible with the use of synchronous modulators. The article proposes to allocate wavelengths to the various channels of the multiplex so that, for given intervals $Z_R$ between repeaters, the signals of the various channels, or to be more precise the bit times of the various channels of the multiplex, are substantially synchronized when they reach the repeaters. That enables in-line synchronous modulation of all the channels at given intervals using lumped synchronous modulators. That multiplex wavelength allocation technique is also described in French Patent Application 96 00732 of Jan. 23, 1996 in the name of Alcatel Submarine Networks. In the article, it is proposed to choose a subgroup of channels which are synchronous not only at intervals $Z_R$ but also at intervals which are sub-multiples of $Z_R$. Other aspects of this wavelength allocation technique are described in the articles by O. Leclerc, E. Desurvire, and O. Audouin, "Synchronous WDM Soliton Regeneration: Toward 80–160 Gbit/s Transoceanic Systems", Optical Fiber Technology, 3, pages 97–116 (1997) and by E. Desurvire et al., "Transoceanic Regenerated Soliton Systems: Designs for over 100 Gbit/s Capacities", Suboptic '97, pages 438–447.

It should be noted that the solutions to the problem of jitter due to asymmetric collisions proposed in the aforementioned articles are not necessarily compatible with this type of wavelength allocation scheme; controlling the dispersion of the fiber would interfere with the synchronicity of the bit times at the synchronous regenerators.

In the case of a single-channel soliton signal transmission system, a large amplification step, typically greater than $Z_0/5$, causes the generation of continuum or dispersive waves; in this case $Z_0$ is the wavelength of the solitons.

OBJECTS AND SUMMARY OF THE INVENTION

The invention consists in a solution to the problem of the asymmetry of collisions between solitons in a wavelength-division multiplex transmission system; it avoids the need to vary the dispersion profile of the transmission fiber along the transmission system. The invention proposes a simple solution which limits time-jitter due to collisions between solitons.

For a single-channel system, the invention proposes a solution which increases the amplification step, or to be more precise the distance between lumped amplifiers. It achieves amplification steps in the order of $Z_0$, typically in the range from 0.8 $Z_0$ to 1.5 $Z_0$, without producing continuum or dispersive waves.

To be more precise, the invention proposes a soliton signal fiber optic transmission system comprising a plurality of fiber segments and of repeaters, wherein at least one fiber segment comprises distributed amplification means and at least one repeater comprises lumped amplification means.

In one embodiment, the transmission system is a wavelength-division multiplex transmission system.

Said fiber segment advantageously adjoins said repeater.

The distributed amplification means preferably comprise a line fiber lightly doped with erbium and means for pumping that fiber.

In one embodiment the amplification means comprise means for pumping the line fiber using the stimulated Raman effect.

In another embodiment the lumped amplification means comprise a strongly erbium-doped fiber amplifier and means for pumping that fiber.

The pumping means are preferably redundant.

The pumping means for the lumped amplification means and the pumping means for the distributed amplification can be common.

In one embodiment, the system includes means for automatically controlling the gain of the lumped amplification means.

The control means can control the gain of the lumped amplification means as a function of the power of the signals sent and received by the repeater.

Means can be provided for automatically controlling the relative gain of the lumped amplification means and the distributed amplification means.

The invention also proposes a method of transmitting soliton signals, comprising:

at least one step of lumped amplification of the signals, and at least one step of distributed amplification of the signals.

The soliton signals are advantageously wavelength-division multiplexed.

In one embodiment, the lumped amplification step includes automatic control of the lumped amplification gain.

A step of controlling the relative gain of the lumped amplification and the distributed amplification can be provided.

The invention also concerns application of a method of the above kind to reducing collision jitter.

It finally concerns a repeater for a soliton signal fiber optic transmission system comprising lumped signal amplification means and pumping means for distributed amplification.

The repeater can be used in a wavelength-division multiplex transmission system.

The pumping means advantageously comprise at least one pump for lightly erbium-doped fiber.

They can also comprise at least one pump for pumping a line fiber using the stimulated Raman effect.

The lumped amplification means preferably comprise a strongly erbium-doped fiber amplifier and means for pumping that fiber.

In one embodiment, the pumping means are redundant.

The pumping means for the lumped amplification means and the pumping means for the distributed amplification means are advantageously one and the same.

BRIEF DESCRIPTION OF THE DRAWINGS

Other features and advantages of the invention will become apparent on reading the following description of embodiments of the invention, which is given by way of example only and with reference to the accompanying drawings, in which:

FIG. 1 is a diagram of a wavelength-division multiplex soliton signal transmission system, FIG. 2 is a diagram of a first embodiment of a repeater in accordance with the invention, FIG. 3 is a graph showing power as a function of distance in the case of bidirectional distributed amplification, FIG. 4 is a graph of power as a function of distance in the case of distributed amplification in the direction opposite the propagation direction, FIG. 5 is a graph of power as a function of distance in the case of distributed amplification in the propagation direction, FIG. 6 is a diagram of another embodiment of a repeater in accordance with the invention, FIG. 7 is a diagram of a multiplexer from the FIG. 6 repeater, FIGS. 8 and 9 are diagrams of a repeater in accordance with the invention, and FIGS. 10 to 12 are diagrams of repeaters in accordance with the invention suitable for bidirectional links.

MORE DETAILED DESCRIPTION

The invention applies to a single-channel or wavelength-division multiplex fiber optic soliton signal transmission system. It is described hereinafter with reference to a wavelength-division multiplex system in which the various wavelengths of the multiplex are chosen to provide a relative slip between the various channels substantially equal to a multiple of the bit time over a given interval. However, it is not limited to a transmission system using this kind of frequency allocation scheme and applies more generally to any wavelength-division multiplex soliton signal transmission system.

The wavelength allocation solutions described in the articles by E. Desurvire and O. Leclerc mentioned above can be used in the example given here. The wavelength allocation schemes of both articles are hereby incorporated in the present specification by reference. This kind of wavelength allocation scheme provides relative slip between the various channels substantially equal to a multiple of the bit time at regular intervals $Z_R$ along the fiber.

As explained above, a problem encountered in wavelength-division multiplex transmission systems, and especially in a system with this kind of wavelength allocation scheme, is that the collisions between the soliton signals in the amplifiers, or more generally in any asymmetric device of the system, induce a variation in the frequency of the solitons; this variation results in time-jitter on arrival; the sign of the frequency variation depends on the relative spectral position of the soliton signals that collide.

To limit this jitter, the invention proposes to use quasi-distributed amplification in the transmission system, i.e. to combine lumped amplifiers and distributed amplification. The distributed amplification limits the degree of asymmetry induced by the lumped amplifiers in the collisions between solitons of adjoining channels and therefore limits time-jitter; the lumped amplifiers avoid the noise and pump power problems of the prior art solutions using only distributed amplifiers. Also, the lumped amplifiers provide improved control of the gain over a transmission system segment.

FIG. 1 is a diagram of a wavelength-division multiplex soliton signal transmission system. The system comprises a transmitter Tx 1 launching signals into a first lien fiber 2 and a receiver Rx 3. There is a plurality of sections or segments $4_i$ between the end of the first line fiber 2 and the receiver 3, $i$ being an integer. Each segment comprises a repeater $5_i$ and a line fiber $6_i$. The repeater $5_i$ of a segment $4_i$ amplifiers the signals that it receives from the line fiber $6_{i-1}$ of the preceding segment and launches the amplified signals into the line fiber $6_i$ of its segment. The transmission system can comprise filters, for example guide filters or other filters, and isolators or other components, not described here. This is known in itself.

FIGS. 2, 6 and 8 to 12 show examples of repeaters that can be used in a transmission system of the invention. In each of the embodiments described with reference to those figures, lumped amplification is used in conjunction with distributed amplification.

FIG. 2 shows a first embodiment of a repeater in accordance with the invention. The embodiment shown in this figure uses distributed amplification in the signal transmission direction and also in the opposite direction and lumped amplification at the repeater. The figure shows a repeater $5_i$, the line fiber $6_{i-1}$ of the preceding segment and the line fiber $6_i$ into which the repeater launches signals.

Along the fiber, in the signal transmission direction, the repeater $5_i$ comprises a coupler 12 (for example a 95/5 coupler) serving as a power sampler and sampling some of the signals received from the fiber $6_i$-1 in order to control the gain, as explained below; it then comprises a multiplexer 14 for launching a pump signal into the line fiber $6_{i-1}$ in the direction opposite the soliton propagation direction; it then comprises a lumped amplifier 16 followed by a multiplexer 18 for launching a pump signal into the line fiber $6_i$ in the soliton propagation direction; it finally comprises, ahead of the line fiber $6_i$, a coupler 20 for sampling a portion of the signals transmitted on the line fiber $6_i$; like the coupler 12, the coupler 20 can be 95/5 coupler, and is also used to control the gain, as explained below. The multiplexers 14 and 18 are WDM couplers in which the pump is 100% coupled into the transmission line, in the direction opposite the signal for the coupler 14 and in the same direction as the signal for the coupler 18.

The repeater $5_i$ comprises control means 22; these control means receive the control signals sampled by the couplers 12 and 20 and control the gain of the lumped amplifier 16 as a function of the received signals, as explained below.

The repeater further comprises pumping means for generating the pumping signals for the multiplexers 14 and 18. The pumping means comprise diodes, for example, whose power and the wavelength are matched to the type of distributed amplification used. The pumps can be semiconductor laser diodes or diode-pumped fiber lasers. The power of the pumping means can be controlled by the control means 22, as in the embodiments shown in FIG. 6 and the subsequent figures.

Note that, in the context of amplification of optical signals in fibers, the expressions "lightly doped" and "strongly doped" are perfectly clear to the skilled person and correspond to a technical reality. The concentrations are typically expressed in dB/m or in dB/km of absorption due to the dopant as well as in ppm, weight %, molar % and otherwise. For the skilled person these various definitions are equivalent. Lightly doped fibers, for example with concentrations in the order of 1 to 10 dB/km, provide distributed amplification, for example in the line fiber, over distances greater than a few km or more. Strongly doped fibers, for example with concentrations in the order of 1 to 10 dB/m, provide amplification over a few meters or tens of meters of fiber. In the same register, the skilled person clearly understands the distinction between "lumped amplification" and "distributed amplification". The expression "lumped amplification" is generally used when the amplifier fiber is located in a repeater, is would on a spool and is not part of the length of the link. On the other hand, the expression "distributed amplification" is used if the amplification gain is provided by a portion of the fiber that is part of the transmission cable.

In the FIG. 2 embodiment, the pumping means comprise two diodes 24 and 26 whose respective outputs are connected to the multiplexers 14 and 18 via a 3 dB or 50/50 coupler 28. This arrangement is redundant and provides pumping in both directions, even if one of the two diodes fails.

How the FIG. 2 device works will now be explained with reference to FIG. 3; this shows on the ordinate axis the ratio of the power P over the average power $P_{avg}$ of a soliton as a function of its propagation distance $\underline{z}$. The repeaters are at a distance $kZ_a$, where $\underline{k}$ is an integer; FIG. 3 corresponds to the situation of bidirectional distributed amplification. Between two repeaters, as shown in the figure, the ratio of the power to the average power is initially (after a repeater) convex downwards, because of the distributed amplification in the propagation direction: the ratio is thereafter (before the next repeater) convex upwards, because of the distributed amplification in the direction opposite the propagation direction. The variation of power in the repeater at the abscissa $(k-1)Z_a$ (symbolized by the arrow G in FIG. 3) shows the gain of the lumped amplifier in the repeater.

The invention controls the gain in the repeater as a function of the set point powers using this lumped amplification. Accordingly, if the power received at the input of the repeater $5_i$ is too low, the gain G of the lumped amplifier of the repeater can be increased to obtain the set point power at the repeater output. A power at the input that is too low may be the result of greater losses than predicted in the fiber $6_{i-1}$, for example; it can also be the result of too low a pump power in the direction opposite the signal propagation direction, for example if one of the pumps of a redundant arrangement has failed. Conversely, if the power received at the input of the repeater $5_i$ is higher than the set point value, the gain G of the lumped amplifier of the repeater can be reduced to obtain the set point power at the repeater output. Note that the couplers 12 and 20 can be used to sample the total power on all the channels or the power on a reference channel; filter means for selecting the corresponding signals are not shown in FIG. 2 or in the subsequent figures. The position of the couplers 12, 20 sampling the signals is chosen according to the extinction capabilities of the pump, and in particular the coupler 20 from FIG. 2 could be on the upstream side of the coupler 18 that injects the pump, i.e. to the left of that coupler in FIG. 2. The position of the coupler 12 relative to the coupler 14 is immaterial given the signal and pump directions.

In this mode of operation the gain of the lumped amplifier is controlled. This has the advantage of simple feedback on the basis of the received power and the transmitted power. The power of the pump or pumps used for distributed amplification can also be controlled; this solution doe snot provide feedback, but can be beneficial, for example to compensate aging of the link or a systematic error.

FIG. 4 is analogous to FIG. 3 for distributed amplification in the direction opposite the soliton propagation direction in conjunction with lumped amplification. A repeater for this type of amplification is simply obtained from the repeater shown in FIG. 2 by eliminating the multiplexer 18. Retaining the same pump configuration as FIG. 2 has the advantage of redundancy, but is not mandatory. The figure shows that the curve of the ratio of the power and the average power is convex upwards between two repeaters. As in FIG. 3, the variation of power in the repeater because of the lumped amplification is used to compensate power variations relative to the intended power.

FIG. 5 is analogous to FIG. 4 but for distributed amplification in the soliton propagation direction, again in conjunction with lumped amplification. A repeater for this type of amplification is simply obtained from the FIG. 2 repeater by eliminating the multiplexer 14. The curve of the ratio of the power and the average power is convex downwards between two repeaters. As in FIGS. 3 and 4, the variation of power in the repeater because of the lumped amplification is used to compensate power variations relative to the theoretical power.

In the above three configurations the invention provides automatic gain control simply by measuring the power of the received signals and applying feedback to the lumped amplifier gain; it enables the gain to be adapted to allow for losses induced by the various line components. Compared to a purely distributed solution, the invention provides simple and effective gain control at the repeater. Compared to a purely lumped solution, the invention limits time-jitter due to the asymmetry of collisions; the lumped amplification in the repeater is de facto less important.

FIG. 6 shows another embodiment of a repeater in accordance with the invention. The FIG. 6 repeater is similar to that from FIG. 2 in that it uses distributed amplification in the signal propagation direction and in the direction opposite the signal propagation direction. However, the FIG. 2 repeater uses common pumping means for the distributed amplification and for the lumped amplification. FIG. 6 shows, in the signal propagation direction:

- a line fiber $6_{i-1}$ forming a distributed amplifier, for example fiber lightly doped with erbium; the end of this fiber is connected to the repeater $5_i$;
- a coupler 30 for sampling a portion of the signals received at its input by the repeater;
- a multiplexer 32 for launching pump signals in the direction opposite the signal propagation direction and in the propagation direction; this multiplexer is shown in more detail in FIG. 7;
- an erbium-doped fiber segment forming a lumped amplifier 34;
- an isolator 36; and
- a coupler 38 for sampling a portion of the signals supplied t its output by the repeater.

The signals are then launched into the line fiber $6_i$, which also forms a distributed amplifier.

the pumping means of the FIG. 2 system comprise two pumps 40 and 42, for example laser diodes. The signals supplied at respective outputs of the pumps are fed to the multiplexer 32 via a coupler 44 with a transmission ratio of h/(1−h). The value of the coefficient h and/or the respective values of the output powers of the pumps 40 and 42 are controlled by control means 46 receiving the signals sampled at the repeater input and output. As in the FIG. 2 system, the power used for the distributed amplification and for the lumped amplification is controlled. In the FIG. 6 system, it is easy to determine that the pumping power in the direction opposite the signal propagation direction is $h·P_1+(1−h)·P_2$ and the pumping power in the signal propagation direction is $h·P_2+(1−h)·P_1$, where $P_1$ is the power supplied by the pump 40 and $P_2$ is the power supplied by the pump 42. Clearly the pumping signal used in the signal propagation direction assures both amplification in the lumped amplifier and amplification in the line fiber $6_i$ downstream of the repeater, where appropriate and as a function of the residual power available; as a result of this the fiber between the repeaters is entirely pumped in the direction opposite the propagation direction. The FIG. 6 system is advantageous in particular in the case where the same type of amplification is used in both amplifiers. It leads to a power variation of the type shown in FIG. 3 or FIG. 4 if the residual power after lumped amplification is insufficient for pumping the distributed amplifier in the propagation direction.

FIG. 7 shows the multiplexer from FIG. 6 in more detail. The multiplexer 32 from FIG. 6 in fact comprises two multiplexers 46 and 48, one coupling signals from one branch of the coupler 44 into the line fiber in the direction opposite the propagation direction and the other coupling signals from the other branch of the coupler into the line fiber in the propagation direction. The multiplexers 46 and 48 are of the same type as the multiplexers 14 and 18 in FIG. 2, for example.

FIG. 6 shows the case of distributed pumping in the direction opposite the propagation direction and lumped pumping in the propagation direction. A converse configuration could be obtained in a system similar to that from FIG. 6 merely by disposing the multiplexer 32 between the lumped amplifier 34 and the isolator 36. In this case, the lumped amplifier would be pumped by the pump signal propagating in the direction opposite the signal propagation direction and the lumped amplifier would be pumped by the pump signal propagating in the signal propagation direction. In this case a power variation of the type shown in FIG. 5 is obtained.

FIG. 8 is another diagram of a repeater in accordance with the invention. The FIG. 8 repeater is identical to that from FIG. 6 except that it comprises a second series of pumping means, identical to those from FIG. 6, between the lumped amplifier and the isolator. The reference numbers for the second series of pumping means are those from FIG. 6 increased by 1. The control means control the gains of the pump 40, 42, 41 and 43 and/or the coupling coefficients of the couplers 44 and 45. In FIG. 8, the lumped amplifier is pumped by pump signals in both propagation directions from the multiplexers 32 and 33; the line fiber is also pumped between the repeaters, in both directions. For example, the line fiber $6_{i−1}$ is pumped in the direction opposite the signal propagation direction by the signal from the multiplexer 32 of the repeater $5_i$; the same line fiber is pumped in the signal propagation direction by the pump signal from the multiplexer 33 of the repeater $5_{i−1}$.

The operation of the FIG. 8 system is analogous to that of the systems shown in the preceding figures. Again it is clear that the respective pumping powers in the propagation direction and in the direction opposite the propagation direction or the lumped pumping power can be altered.

In the FIG. 8 system, the signals supplied by the two branches of the coupler 44 could be coupled into the fiber in the signal propagation direction by the multiplexers 32 and 33; conversely, the signals supplied by the two branches of the coupler 45 would be coupled into the fiber in the direction opposite the signal propagation direction by the multiplexers 32 and 33. The system modified in this way would provide a redundant source 40, 42 in one propagation direction and a separate redundant source 41, 43 in the other propagation direction.

FIG. 9 shows another example of a repeater in accordance with the invention. The FIG. 9 repeater is similar to that from FIG. 6; however, it has two multiplexers 50 and 52 between the coupler 30 and the lumped amplifier 34, a multiplexer 51 between the amplifier 34 and the isolator 36, and a multiplexer 53 between the isolator 36 and the coupler 38. The repeater has pumps analogous to those shown in FIG. 8; the pumps are grouped into two groups, as in FIG. 8; in the FIG. 9 system, the signals from the coupler 44 are used for pumping in the propagation direction by means of the multiplexers 52 and 53. The signals from the coupler 45 are used for pumping in the direction opposite the propagation direction by means of the multiplexers 50 and 51. In this way the pump power can easily be controlled in both directions; also, the distributed pumping signals in the propagation direction do not need to pass through the isolator. The system is a distributed amplification system with pumping in the signal propagation direction (multiplexer 53) and in the direction opposite the signal propagation direction (multiplexer 50); similarly, the lumped amplifier is also pumped in the propagation direction (multiplexer 52) and in the direction opposite the signal propagation direction (multiplexer 51). This configuration uses 3-port multiplexers. The number of multiplexers can be reduced to two by using 4-port multiplexers or a system with three multiplexers can be obtained by using one 4-port multiplexer and two 3-port multiplexers; a system of this kind, with multiplexers on both sides of the isolator, avoids the pump signals passing through the isolator. As explained with reference to the preceding figures, the FIG. 9 system can be adapted to provide distributed amplification in only one direction.

FIG. 10 shows a repeater that is particularly suitable for a bidirectional link. The FIG. 10 repeater has pumping means common to both propagation directions, which assures a high level of redundancy and limits the number of pumps. The FIG. 10 repeater is in fact formed of two repeaters of the type shown in FIG. 6 each mounted on one link. The reference numbers of the second system used on the down link are increased by 100 relative to those of their counterparts in the first system used on the up link. As in the FIG. 6 system, the multiplexer 32 or 132 receives the signals from a coupler 44 or 144. The repeater comprises a first pump 60 whose output signal is fed to a coupler 62; the signals supplied by the coupler 62 feed the couplers 44 and 144. The repeater also comprises a second pump 61 whose output signal is fed to a coupler 63; the signals supplied by the coupler 63 feed the couplers 44 and 144. Note that the couplers 62 and 63 in this system have exactly the same coupling coefficient and are in opposite directions so that, for exactly the same pump powers, the same pumping power is launched into each link.

FIG. 10 doe snot show the control means or the couplers for measuring the power of the signals on each link at the input and output of the repeaters. It is clear that the power on each link, in each propagation direction, can be matched by varying the pump power and/or the coupling coefficients of one or more couplers.

The FIG. 10 system enables the use of redundant pumping means common to both links. In each link it pumps the distributed amplifiers in the direction opposite the propagation direction and the lumped amplifiers in the signal propagation direction. Any residual portion of the lumped amplifier pump signals also pumps the distributed amplifier in the signal propagation direction.

A system of the same kind can be obtained from the systems of FIGS. 8 and 9, as is apparent in the remainder of the description relating to FIG. 8. FIG. 11 shows another repeater particularly suitable for a bidirectional link. The FIG. 11 repeater also has pumping means common to the two signal propagation directions. It is derived from the FIG. 8 system: the FIG. 11 repeater comprises lumped and distributed amplifiers and multiplexers of the type shown in FIG. 8 in each signal propagation direction; the same reference numbers are used as in FIG. 8, increased by 100 for the down link relative to the reference numbers used for the up link. The FIG. 11 system comprises a first set of pumps and couplers identical to that shown in FIG. 10 for the multiplexers 32 and 133 on the upstream side of the lumped amplifier on the up link and on the downstream side of the lumped amplifier 134 on the down link. It comprises a second identical set for the multiplexers 33 and 132 on the downstream side of the lumped amplifier 34 on the up link and on the upstream side of the lumped amplifier 134 on the down link. The reference numbers for the second set are obtained by adding 200 to the reference numbers used in FIG. 10.

FIG. 11 shows in dashed line the option of adding one or two further couplers. The coupler 70 is on the fibers connecting the couplers 63 and 44, on the one hand, and the couplers 262 and 244, on the other hand. The coupler 71 is on the fibers connecting the couplers 63 and 144, on the one hand, and the couplers 262 and 344, on the other hand. One or other of these couplers increases the redundancy of the repeater.

The control means are not shown; they are used as necessary to control the lumped or distributed pumping power in each signal propagation direction by varying the relative powers of the pumps and/or the coupling coefficients of the various couplers.

FIG. 12 shows another type of repeater for a bidirectional link. The FIG. 12 system shows how the various pumps can be assigned to pumping in one direction or another by appropriately connecting the couplers. The FIG. 12 system is identical to that from FIG. 11 in so far as the amplifiers and the multiplexers are concerned. It differs from the FIG. 11 system in that it does not include the couplers 44, 144, 244 and 344. The connections are as follows:

one output of the coupler 62 is connected directly to the multiplexer 32 for pumping the lumped amplifier 34 in the signal propagation direction;

the other output of the coupler 62 is connected directly to the multiplexer 133 for pumping the lumped amplifier 134 in the direction opposite the signal propagation direction;

one output of the coupler 63 is connected directly to the multiplexer 33 for pumping the distributed amplifier $6_i$ in the signal propagation direction;

the other output of the coupler 63 is connected directly to the multiplexer 132 for pumping the distributed amplifier $106_{i-1}$ in the direction opposite the signal propagation direction;

one output of the coupler 162 is connected directly to the multiplexer 32 for pumping the distributed amplifier $6_i$ in the direction opposite the signal propagation direction;

the other output of the coupler 162 is connected directly to the multiplexer 133 for pumping the distributed amplifier $106_i$ in the signal propagation direction;

one output of the coupler 163 is connected directly to the multiplexer 33 for pumping the lumped amplifier 34 in the direction opposite the signal propagation direction; and the other output of the coupler 163 is connected directly to the multiplexer 150 for pumping the lumped amplifier 134 in the signal propagation direction.

In a system of the above kind, the pumps 60 and 61 provide the pumping in the propagation direction of signals on the up link and in the direction opposite the propagation direction of signals on the down link. Conversely, the pumps 62 and 63 provide the pumping in the direction opposite the propagation direction of signals on the up link and in the propagation direction of signals on the down link.

In a similar manner to what is shown in FIG. 11, one or more additional couplers can be provided between the pumps for the opposite directions of each link for increased redundancy. FIG. 12 shows two couplers 74 and 174 of this kind:

the coupler 74 couples the fiber connecting the coupler 63 to the multiplexer 33, on the one hand, and the fiber connecting the coupler 162 to the multiplexer 32, on the other hand; and the coupler couples the fiber connecting the coupler 63 to the multiplexer 132, on the one hand, and the fiber connecting the coupler 162 to the multiplexer 133, on the other hand.

In this case there is also redundancy between the pumps of the distributed amplifiers for the two propagation directions on both links.

Couplers could also be provided between the pumps of the lumped amplifiers 34 or 134 on one or other of the links. On the up link, a coupler of this kind would couple the fiber connecting the coupler 62 to the multiplexer 32, on the one hand, and the fiber connecting the coupler 163 to the multiplexer 33, on the other hand. On the down link, the coupler would couple the fiber connecting the coupler 62 to the multiplexer 133, on the one hand, and the fiber connecting the coupler 163 to the multiplexer 132, on the other hand.

By providing all the above couplers, or only some of them, redundancy can be assured not only between the up link and the down link but also on the same link, between the pumps of the same type of amplifier for both directions.

The FIG. 1 transmission system can advantageously feature a set of identical repeaters, for example of the type described with reference to FIGS. 2, 6, 8 or 9 or of the type shown in FIGS. 10, 11 or 12 in the case of a bidirectional link. However, it is also possible to provide different repeaters and to obtain power profiles between the various repeaters of the type shown in FIGS. 3, 4 or 5; it is further possible to provide a combination of distributed amplification and lumped amplification on some segments only, the other segments using purely distributed or purely lumped solutions known in themselves.

Obviously, the invention is not limited to the embodiments described by way of example. The wavelength allocation scheme is in no way limited to the examples described. Note that filters or isolators can be added or removed to the embodiments described, as required. Note also that the type of pumping means used can be adapted as required and that the various pumping means described with reference to the various figures can if necessary be interchanged; each type of pumping means has its own features and advantages. The coupling means and the number of pumps are chosen according to the required redundancy.

Finally, the preferred embodiments of the invention are described in the case of a multiplex system; the invention also applies to a single-channel system.

What is claimed is:

1. A soliton signal fiber optic transmission system comprising a plurality of fiber segments and of repeaters, wherein at least one fiber segment comprises distributed amplification means and at least one repeater comprises lumped amplification means.

2. A transmission system according to claim 1, the transmission system being a wavelength-division multiplex transmission system.

3. A transmission system according to claim 1, wherein said fiber segment is adjacent said repeater.

4. A transmission system according to claim 1, wherein the distributed amplification means comprise a line fiber lightly doped with erbium and means for pumping that fiber.

5. A transmission system according to claim 1, wherein the amplification means comprise means for pumping the line fiber by the stimulated Raman effect.

6. A transmission system according to claim 1, wherein the lumped amplification means comprise a strongly erbium-doped fiber amplifier and means for pumping that fiber.

7. A transmission system according to claim 4, wherein the pumping means are redundant.

8. A transmission system according to claim 4, wherein the pumping means for the lumped amplification means and the pumping means for the distributed amplification are one and the same.

9. A transmission system according to claim 1, including means for automatically controlling the gain of the lumped amplification means.

10. A transmission system according to claim 9, including control means for controlling the gain of the lumped amplification means as a function of the power of the signals sent and received by the repeater.

11. A transmission system according to claim 1, including means for automatically controlling the relative gain of the lumped amplification means and the distributed amplification means.

12. A method of transmitting soliton signals, comprising:

at least one step of lumped amplification of the signals, and at least one step of distributed amplification of the signals.

13. A method according to claim 12, wherein the soliton signals are wavelength-division multiplexed.

14. A method according to claim 12, wherein the lumped amplification step includes automatic control of the gain of the lumped amplification.

15. A method according to claim 12, including a step of controlling the relative gain of the lumped amplification and the distributed amplification.

16. Application of the method according to claim 13 to reducing collision jitter.

17. A repeater for a fiber optic soliton signal transmission system, comprising means for lumped amplification of the signals and pumping means for distributed amplification.

18. A repeater according to claim 17, wherein the transmission system is a wavelength-division multiplex transmission system.

19. A repeater according to claim 17, wherein the pumping means comprise at least one pump for lightly erbium-doped fiber.

20. A repeater according to claim 17, wherein the pumping means comprise at least one pump for pumping a line fiber by the stimulated Raman effect.

21. A repeater according to claim 17, wherein the lumped amplification means comprise a strongly erbium-doped fiber amplifier and means for pumping that fiber.

22. A repeater according to claim 17, wherein the pumping means are redundant.

23. A repeater according to claim 21, wherein the pumping means for the lumped amplification means and the pumping means for the distributed amplification are one and the same.

* * * * *